Patented Sept. 19, 1944

2,358,549

UNITED STATES PATENT OFFICE 2,358,549

GEL-FORMING COMPOSITION

Peter R. Wenck, Midland, Mich., assignor to The Dow Chemical Company, Midland, Mich., a corporation of Michigan No Drawing. Application July 4, 1942,
Serial No. 449,841

6 Claims. (Cl. 195—100)

This invention relates to hydrogel-forming and hydrogel compositions and particularly to compositions valuable in the culturing of micro-organisms.

Hydrogel type media used in the culturing of micro-organisms have heretofore usually been prepared with agar-agar as the gelling constituent. Nutrient ingredients, such as malt extract, yeast extract, beef extract, peptone, small amounts of inorganic salts, etc., are usually included to promote the growth of the micro-organisms. The agar-agar is usually conceded to act only as a gelling agent, although under certain circumstances and with certain organisms it may be attacked and the gel may be liquefied. Agar-agar is of particular value in preparing culture plates, slants, etc., for the propagation of micro-organisms because of its high immunity to attack by the micro-organisms themselves and because of its characteristic gelling properties. Thus agar-agar may be readily dispersed in hot water and the resulting syrupy dispersion may be cooled to as low as 40° C. and manipulated while still fluid. Upon further cooling gelation occurs and the resulting gel may then be heated to from 80° to 90° C. without returning to the fluid state. Heating to above 90° C. causes liquefaction. Because of these properties it is possible to disperse the agar-agar and nutrient in water, sterilize the mixture and then, after it has cooled to about 40° C., to inoculate the mixture with a culture of the desired micro-organism and distribute the latter throughout the mixture by stirring the still fluid composition. Upon further cooling, the mixture gels and the organisms, upon growing, are visible as distinct clumps or colonies scattered throughout the gel which may be counted or otherwise evaluated. After the medium has gelled, incubation may be carried on at temperatures considerably above the temperature at which inoculation was carried out without liquefying the medium. Culture plates and slants are usually prepared containing from 1.8 to 2.0 per cent agar-agar.

The use of agar-agar for the culturing of micro-organisms is, however, disadvantageous in certain respects. Thus, agar-agar is usually produced in countries foreign to the United States and it is at times expensive and very difficult to obtain. Since the biologist has been accustomed to using agar-agar almost exclusively in preparing his media, the substitution of the agar-agar with any other product which has different physical and gelling properties involves a revision of the entire culturing technique. An additional disadvantage is the fact that agar-agar does not readily form gels in water solutions containing relatively high concentrations of inorganic salts. For this reason it is not usually possible to use agar-agar hydrogels in working with organisms, such as piscicolous organisms, which flourish in sea water or other water of high salt content. In working with organisms of this type, it has been the practice in the past to use silica gel in place of the agar-agar, but this is inconvenient to manipulate and involves a technique differing materially from the technique employed with agar-agar gels.

It is an object, therefore, of this invention to provide a gel-forming composition by means of which plates, slants and other hydrogel type media useful in the culturing of micro-organisms may be prepared, which reduces greatly the amount of the agar-agar which it is necessary to use in preparing the media and which forms gels having substantially the same properties as gels prepared with agar-agar. An additional object is to provide a gel of reduced agar-agar content which may be manipulated in substantially the same manner in which gels containing only agar-agar as the gelling constituent are ordinarily manipulated in the culturing of micro-organisms.

These and related objects are readily accomplished by reducing the proportion of agar-agar in the composition and incorporating therewith a water-soluble salt of cellulose glycolic acid.

Although any water-soluble salt of cellulose glycolic acid may be used, a water-soluble salt such as the ammonium or an alkali-metal salt of a cellulose glycolic acid of such degree of substitution that its sodium salt is soluble in water is preferred. It is well known that all cellulose glycolic acids form sodium salts. However, the sodium salts of lowly substituted cellulose glycolic acids are soluble in water only in the presence of an alkaline reacting compound, e. g. sodium hydroxide, potassium hydroxide, alkaline salts, etc. Cellulose glycolic acids of somewhat higher degree of substitution form sodium salts which are readily soluble in water alone, and it is with the water-soluble salts of such cellulose glycolic acids that the present invention is concerned. Such water-soluble salts are readily available commercially. Although a previously prepared water-soluble salt of the cellulose glycolic acid is preferably used, it should be mentioned that the free cellulose glycolic acid may be used, if desired, in which case it may be converted readily to the water-soluble salt by stirring it, together with the appropriate alkali, in water.

Although the salt of cellulose glycolic acid and the agar-agar may be used in a wide range of proportions, it has usually been found advantageous to use from 0.25 to 1.5 parts, and preferably from 0.5 to 1.25 parts, of agar-agar for each part of sodium cellulose glycolate. Aqueous dispersions of satisfactory gelling properties may be prepared containing from 1 to 2 per cent and preferably from 1.2 to 1.8 per cent by weight of the mixture of water-soluble salt of cellulose glycolic acid and agar-agar.

The dispersion or solution of the cellulose glycolate and of the agar-agar may be prepared in any convenient manner. Thus, the two materials may be mixed in the dry state, preferably in powder form, and the dry mixture may then be stirred carefully into either cold or hot water. The dry powdered mixture, which is storage-stable and which may be prepared and stored until required, has a tendency, when stirred into water, to form into balls or soft lumps which are difficult to disperse and it is necessary to maintain vigorous agitation until the powder is thoroughly wetted. Alternatively the dry mixture may be stirred into a thick paste with a small portion of the water until all the particles are thoroughly wetted and this paste may then be stirred into the main portion of the water. Surface active agents, such as wetting agents and the like, may be combined with the dry powder to facilitate dispersion of the powder in the water provided such agent is not objectionable in the finished medium. The dispersion or solution may also be prepared by stirring the water-soluble salt of cellulose glycolic acid and the agar-agar separately into the water or they may be stirred into separate portions of the water and the two portions then combined. Inorganic salts in relatively high concentration may be included in the medium if desired. This is of particular advantage in case it is desired to culture micro-organisms requiring a high concentration of salts for growth. Nutrients for the micro-organisms may also be incorporated in the medium either before or after dispersion of the gel-forming constituents and, if desired, the composition may then be sterilized with steam in the usual manner prior to inoculation with the desired organisms. Alternaitvely, such of the inorganic salts and/or nutrients just referred to as may be prepared in solid form may be mixed with the dry, powdered mixture of the water-soluble salt of cellulose glycolic acid and agar-agar and dispersed in the water along with the mixture. Other gelling agents, such as silica gel, starch, etc., may be incorporated in the dry mixture or in the final medium, if desired.

Gel-type media prepared in the manner just described are well suited to the culturing of a wide variety of micro-organisms among which may be mentioned *Escherichia communior, Aerobacter aerogenes, Bacillus mesentericus, Cellulomonas biazotea, Saccharomyces cerevisiae, Torula utilis, Aspergillus niger, Chaetomium globosum, Fusarium saubenettii, Rhizoctonium solani, Lenzites trabea*.

The gels, when prepared as herein described are practically clear and, although somewhat softer than the usual gel prepared with aga-agar alone, are sufficiently rigid so that Petri dishes containing the gel may be inverted during incubation without danger of the gel falling. Incubation may be carried out at temperatures as high as from 50° to 70° C. without materially decreasing the rigidity of the gel. The sterilized fluid medium may be cooled and held for some time at from 40° to 45° C. before gelation proceeds far enough to render uniform inoculation difficult. The development of colonies of micro-organisms in the new medium proceeds in a manner similar to the development in the conventional agar-agar medium, the principal difference being that in the new medium the colonies tend to be somewhat more irregular in shape than in the conventional medium. Counting of the colonies is, however, facilitated because the individual colonies are compact and well defined.

While the invention has been described with particular reference to the use of a mixture comprising a water-soluble salt of cellulose glycolic acid and agar-agar in the preparation of media for the propagation of micro-organisms, it is to be understood that the composition is also of value in the preparation of pharmaceutical products such as mineral oil emulsions, etc., and for other purposes where the peculiar properties of agar-agar hydrogels are of value.

*Example 1*

An aqueous beef extract-peptone culture medium was prepared using .6 per cent agar-agar and .7 per cent sodium cellulose glycolate as the gelling constituents. The powdered mixture of agar-agar and sodium cellulose glycolate was added slowly to the solution of beef extract-peptone in water with vigorous stirring. An even dispersion was obtained. The mixture was autoclaved with steam in the usual manner at 115° C. and then allowed to cool to about 45° C. 1 cubic centimeter portions of water suspensions of *Cellulomonas biazotea, Aspergillus niger, Lenzites trabea, Aerobacter aerogens* and *Bacillus mesentericus* were placed in separate Petri dishes, sufficient of the cooled medium added to form a layer about 0.25 inch thick in each dish, and the contents of each dish was stirred to distribute the inoculum evenly throughout the medium. After standing for a short time at room temperature to permit the medium to gel, the plates were incubated at 30 C. for 48 hours. At the end of this time it was observed that the separate colonies of organisms in each plate were very distinct and easily counted and that the consistency and general appearance of the plates were very similar to those of the media formed and incubated under similar conditions, but using from 1.5 to 2 per cent of agar-agar as the gelling constituent.

*Example 2*

An aqueous beef extract-peptone medium was prepared as in Example 1 and duplicate series of plates poured from it were inoculated with 1 cubic centimeter portions from a domestic water supply. For comparative purposes another series of similar plates were prepared using only agar-agar as the gelling constituent. These plates were inoculated with 1 cubic centimeter portions from the same domestic water supply. The three series of plates were then incubated at 30° C. for 48 hours and bacterial counts taken on each plate. The average counts from each of the three series coincided within the limits of experimental error.

I claim:

1. A hydrogel-forming composition including a water-soluble salt of cellulose glycolic acid and agar-agar.

2. A hydrogel-forming composition including a water-soluble salt of a cellulose glycolic acid whose sodium salt is soluble in water and from about 0.25 to about 1.5 parts of agar-agar for each part of said water-soluble salt.

3. A dry hydrogel-forming composition including a water-soluble salt of a cellulose glycolic acid whose sodium salt is soluble in water and from 0.25 to 1.5 parts of agar-agar for each part of said water-soluble salt.

4. A hydrogel whereof the gelling constituent includes a water-soluble salt of a cellulose glycolic acid and agar-agar.

5. A hydrogel whereof the gelling constituent includes a water-soluble salt of a cellulose glycolic acid whose sodium salt is soluble in water and from 0.25 to 1.5 parts of agar-agar for each part of said water-soluble salt.

6. A hydrogel propagating medium for microorganisms including from 1 to 2 per cent by weight of a mixture of a water-soluble salt of a cellulose glycolic acid whose sodium salt is soluble in water together with from 0.25 to 1.5 parts of agar-agar for each part of said water-soluble salt.

PETER R. WENCK.